No. 848,767. PATENTED APR. 2, 1907.
E. J. PRINDLE.
METHOD OF TURNING LASTS.
APPLICATION FILED MAY 7, 1904.
7 SHEETS—SHEET 1.
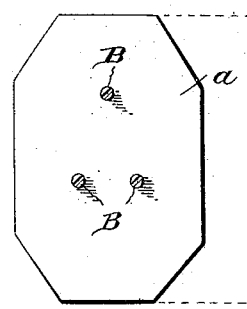
Fig. 1.
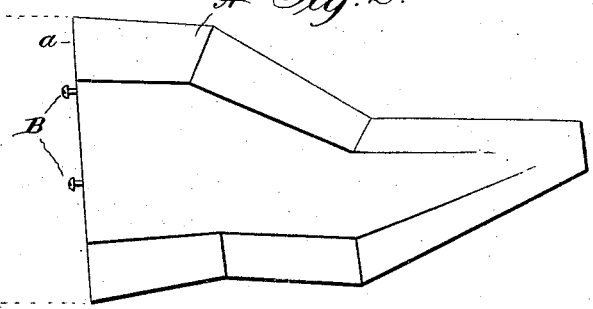
Fig. 2.
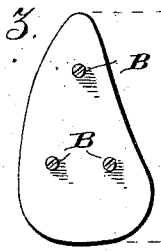
Fig. 3.
Fig. 4.
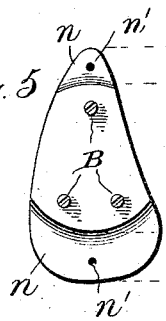
Fig. 5.
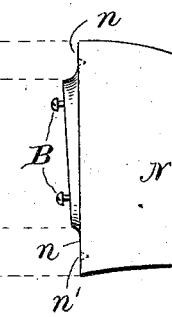
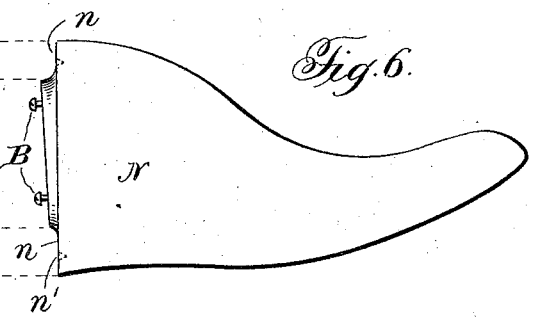
Fig. 6.
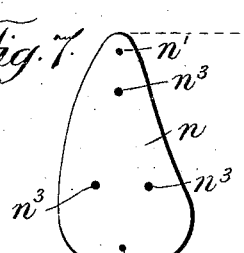
Fig. 7.
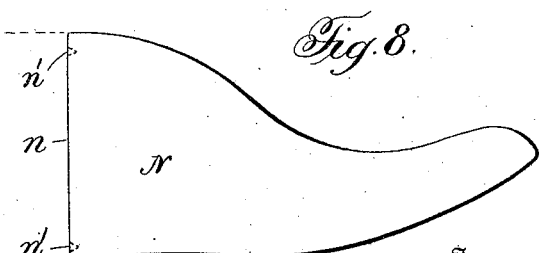
Fig. 8.
Witnesses
Jas. E. Hutchinson
J. L. Lawlor
Inventor
Edwin J. Prindle,
by Prindle and Williamson,
Attorneys.

No. 848,767. PATENTED APR. 2, 1907.
E. J. PRINDLE.
METHOD OF TURNING LASTS.
APPLICATION FILED MAY 7, 1904.
7 SHEETS—SHEET 2.
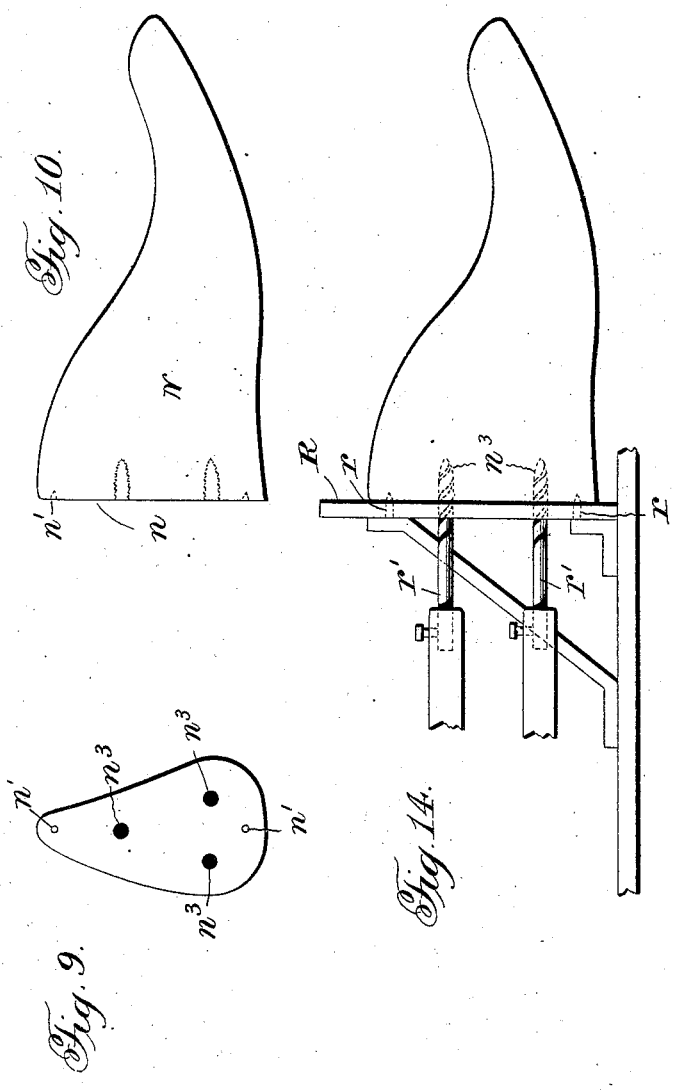

No. 848,767. PATENTED APR. 2, 1907.
E. J. PRINDLE.
METHOD OF TURNING LASTS.
APPLICATION FILED MAY 7, 1904.
7 SHEETS—SHEET 3.
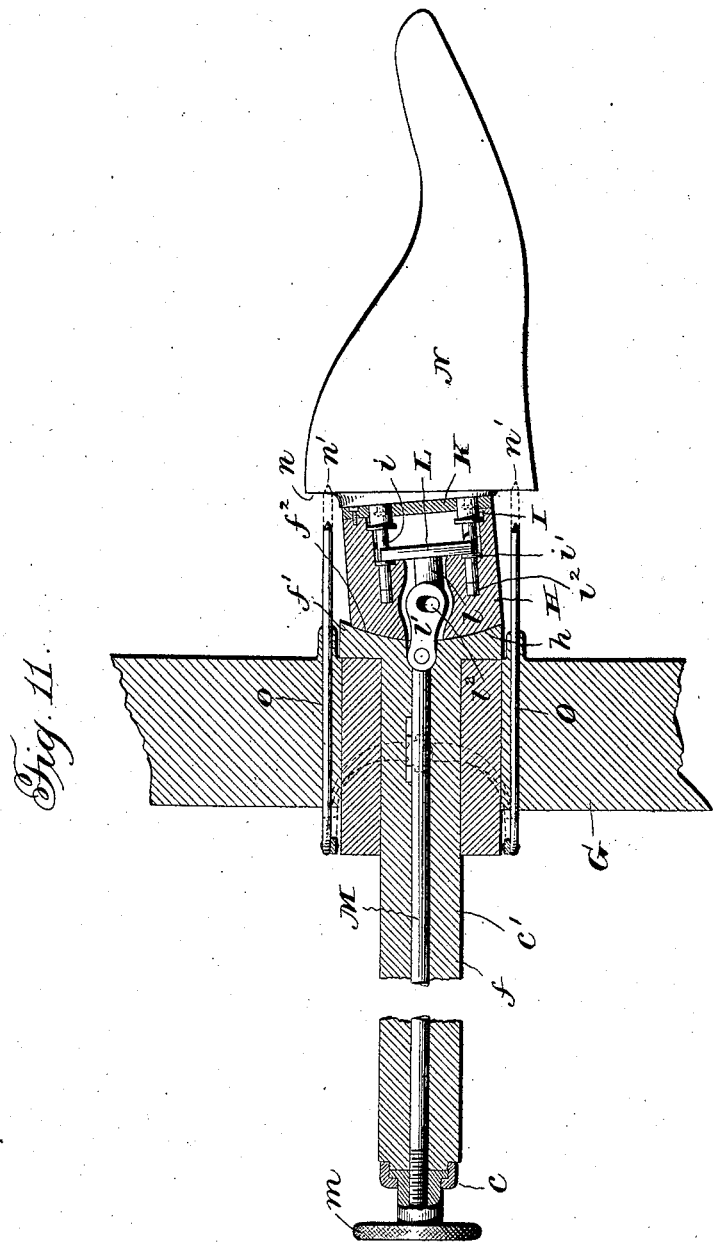
Witnesses
Jas. E. Hutchinson.
J. L. Lawlor.
Inventor
Edwin J. Prindle,
by Prindle and Williamson,
Attorneys.

No. 848,767. PATENTED APR. 2, 1907.
E. J. PRINDLE.
METHOD OF TURNING LASTS.
APPLICATION FILED MAY 7, 1904.

7 SHEETS—SHEET 4.

Witnesses
Jas E Hutchinson
J. L. Lawlor

Inventor
Edwin J. Prindle,
by Prindle & Williamson,
Attorneys.

No. 848,767.

PATENTED APR. 2, 1907.

E. J. PRINDLE.
METHOD OF TURNING LASTS.
APPLICATION FILED MAY 7, 1904.

7 SHEETS—SHEET 5.

Witnesses
Jas. E. Hutchinson
J. L. Lawlor

Inventor
Edwin J. Prindle,
by Prindle and Williamson,
Attorneys.

No. 848,767. PATENTED APR. 2, 1907.
E. J. PRINDLE.
METHOD OF TURNING LASTS.
APPLICATION FILED MAY 7, 1904.

7 SHEETS—SHEET 6.

Witnesses
Jas E Hutchinson
J. L. Lawlor

Inventor
Edwin J. Prindle,
by Prindle and Williamson,
Attorneys.

No. 848,767. PATENTED APR. 2, 1907.
E. J. PRINDLE.
METHOD OF TURNING LASTS.
APPLICATION FILED MAY 7, 1904.
7 SHEETS—SHEET 7.
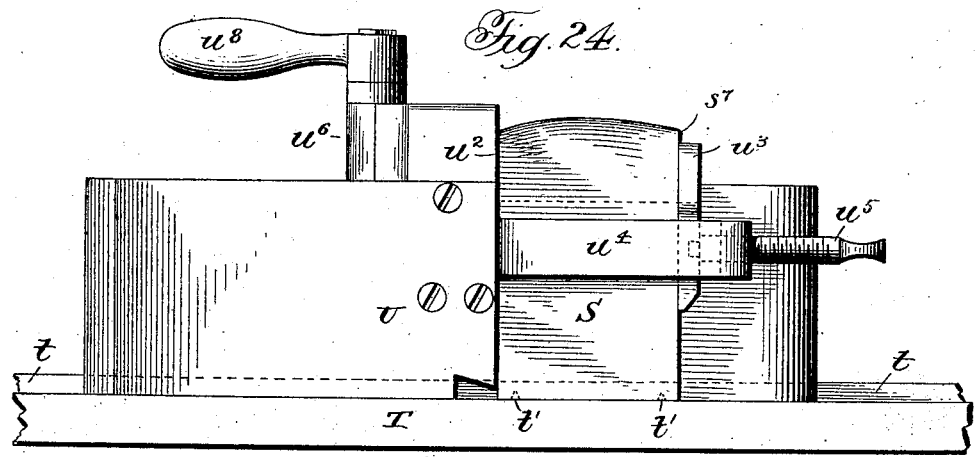
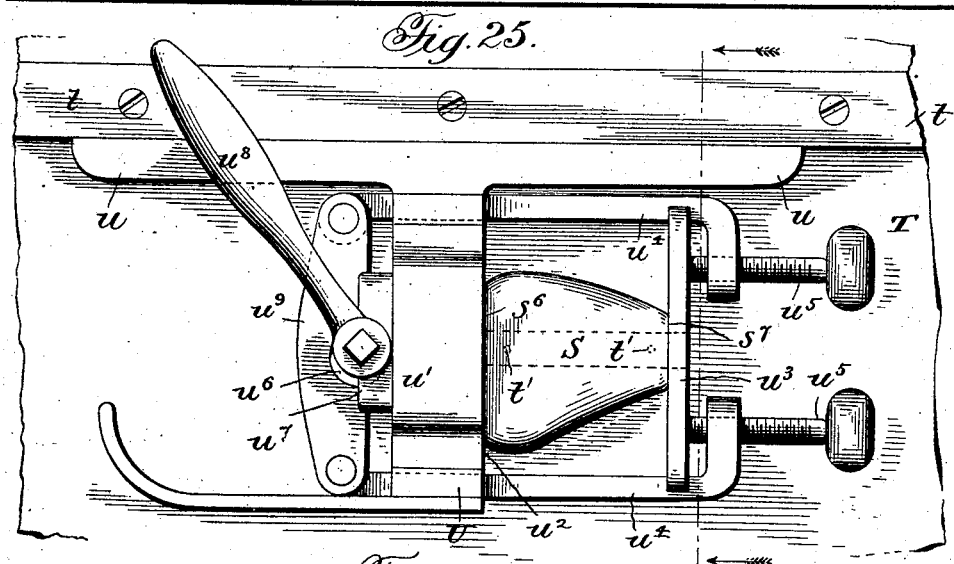
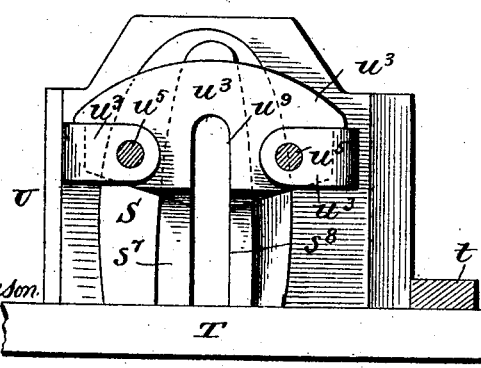

UNITED STATES PATENT OFFICE.

EDWIN J. PRINDLE, OF WASHINGTON, DISTRICT OF COLUMBIA, ASSIGNOR TO THE PREMIER LAST COMPANY, OF GREAT RIVER, LONG ISLAND, NEW YORK, A CORPORATION OF NEW YORK.

METHOD OF TURNING LASTS.

No. 848,767.  Specification of Letters Patent.  Patented March 2, 1907.

Application filed May 7, 1904. Serial No. 206,946.

*To all whom it may concern:*

Be it known that I, EDWIN J. PRINDLE, of Washington, in the District of Columbia, have invented a certain new and useful Improvement in Methods of Turning Lasts; and I do hereby declare that the following is a full, clear, and exact description thereof, reference being had to the accompanying drawings, in which—

Figure 12:
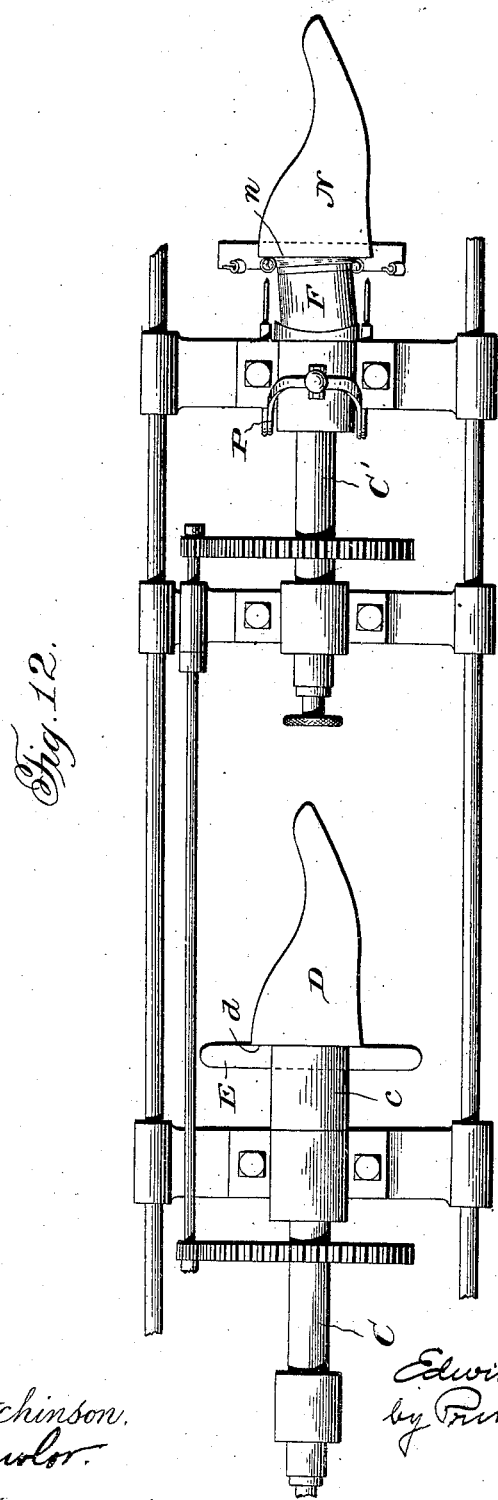
Figure 13:
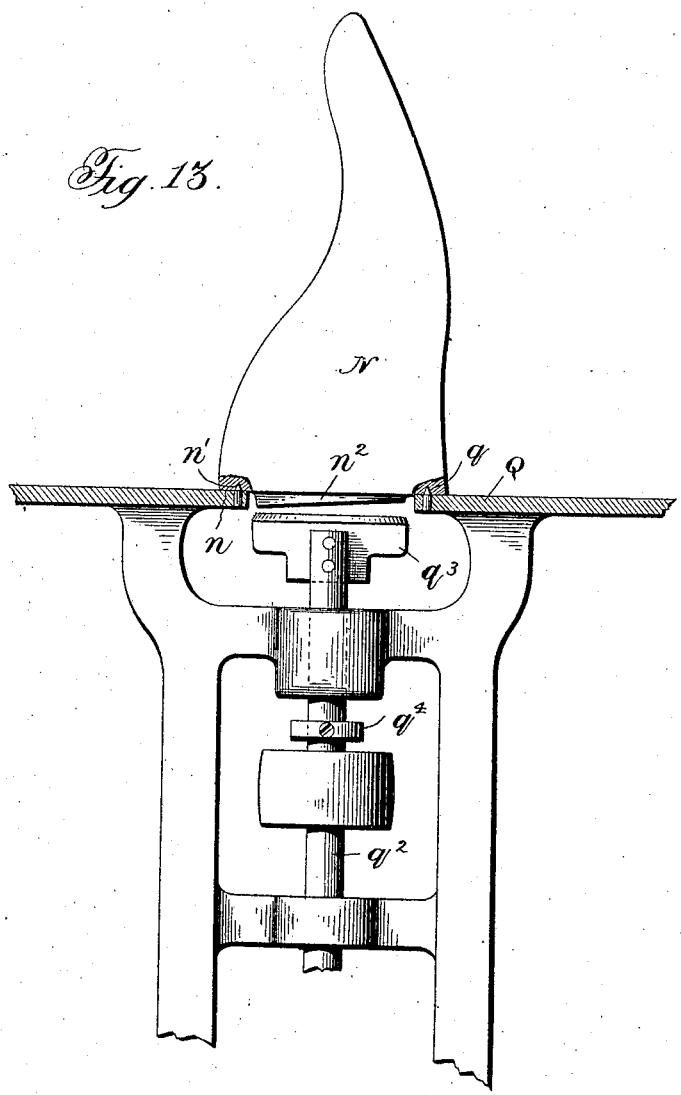
Figure 15:
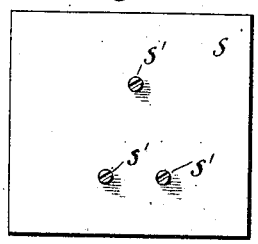
Figure 16:
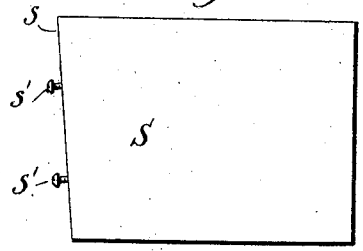
Figure 17:
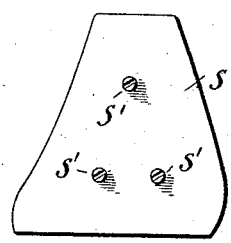
Figure 18:
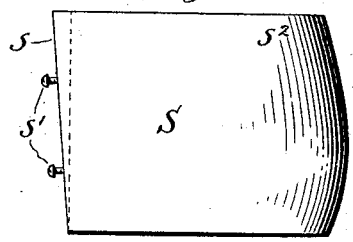
Figure 19:
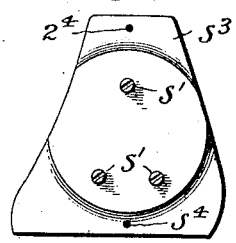
Figure 20:
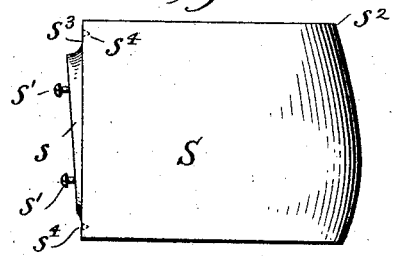
Figure 21:
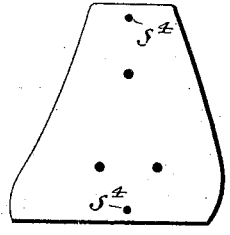
Figure 22:
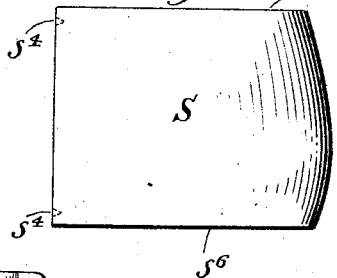
Figure 23:
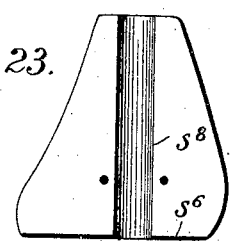

Figures 1 and 2, 3 and 4, 5 and 6, 7 and 8, 9 and 10 are respectively rear, end, and side elevations of a block, showing different successive operations in the formation of a toe part by my method. Fig. 11 is a vertical sectional view of a block-chuck and adjacent portion of the head-stock of a lathe, which chuck is adapted for practicing my method for forming lasts. Fig. 12 is a side elevation of a portion of the swing-frame of a last-lathe, showing one operation in the practice of my method. Fig. 13 is a side elevation, partly in section, of a portion of the machine for dressing off the stub at the rear end of the toe part. Fig. 14 is a side elevation of a portion of a machine for drilling the screw-holes in the rear face of the toe part. Figs. 15 and 16, 17 and 18, 19 and 20, 21 and 22 are respectively end and side elevations illustrating the various successive operations of forming a heel part according to my method. Fig. 23 is an end elevation illustrating the condition of the block after the performing of another operation; and Figs. 24, 25, and 26 are respectively a side elevation, a plan view, and an end elevation representing the heel part in a clamp, by which it is held in cutting the slot illustrated in Fig. 23.

The object of my invention has been to provide a method of forming lasts whereby interchangeable last parts can be formed and whereby the toes and heels of the last parts can be finished in the lathe; and to such ends my invention consists in the method of forming lasts hereinafter specified.

For the purpose of illustration I have chosen the application of my method to the formation of the toe part and heel part of the last which is the subject of an application filed April 25, 1903, Serial No. 154,591, for method of making shoes and lasts for practicing the same. Such last consists of a toe part having three headed screws or projections upon its rear face, which screws are adapted to be engaged by a hinge that is secured in a vertical longitudinal slot in the heel part. The toe part is readily detachable from the hinge, and it is intended to attach toe parts of various styles to any one of a number of standard heel parts having hinges adapted to engage said screws or projections to accomplish which purpose it is necessary that the toe parts and heel parts be interchangeable—that is, be absolutely alike. In forming such a toe part the rear face $a$ of a block A, from which the toe part is to be produced, is formed in a plane, as by sawing, and any desired number of screws B or other headed projections (three in the present instance) are inserted in the said face in the proper position relative to each other, and with their heads the proper distance from the said face to properly engage a chuck, hereinafter described. The block is then roughly shaped to approximate a toe part and is in the condition illustrated in Figs. 1 and 2. The said block is then supported in the swing-frame of a last-lathe, as illustrated in Figs. 11 and 12. The said swing-frame may be of any desired construction and is provided with two head-stock spindles C and C', respectively. Upon the spindle C a chuck $c$ is mounted, the said chuck being of any desired construction which will support a model toe part D by its rear surface $d$ so as to leave a portion of such surface around the periphery, so to speak, exposed and so as to leave the toe of the toe part, as well as the entire foot-shape contour thereof, exposed to contact with the model-wheel E. Upon the spindle E is the chuck F for supporting the block, from which the new toe part is to be turned. The said chuck, as illustrated in Fig. 11, consists of a spindle $f$, mounted in the head-stock G of the swing-frame, the said spindle having upon its right-hand end as viewed in the said figure a head $f'$, upon which is formed a female spherical surface $f^2$, whose center is substantially or approximately in the axis of the said spindle. Against the said female spherical surface $f^2$ bears a block H, upon whose rear end $h$ is formed a male spherical surface. The block H is provided with a number of plugs I, corresponding to the number of screws in the block A, the said plugs bearing at their forward ends in a plate K, secured to the forward end of the block H, and at their rearward ends in cylindrical holes in the said block. The said plugs are substantially like the plugs illustrated in the chuck forming the subject of an application filed of even date herewith, and they are provided at their forward ends with undercut laterally-opening recesses, into which the heads of the screws on the block A can be inserted. When the screws are inserted into the said recesses, the plugs are protruded from the face-plate K and the recesses all open in the same direction. Each plug is provided in its shank with a spiral groove $i$, that is engaged by a pin in a plate L, which plate carries a shank $l$, that is joined to a link $l'$, as by a cross-pin $l^2$, which engages a slot or slots in the link $l'$. The slots which the pin $l^2$ engages are substantially elongated to permit a rotative movement of the shank $l$ with reference to the link. The link $l'$ is pivoted to a rod M, that is keyed in the spindle C', the said rod being engaged at its rearward end by a hand-wheel $m$, that is held against the rear end of the spindle C' by a screw-collar $c$. The plugs I are provided with collars or shoulders $i'$, against which the plate L may bear, and at their rearward ends are half cut away and bear against half-round plugs $i^2$, fixed in the block H. When the hand-wheel $m$ is turned, the rod M is drawn rearward and with it the plate L, which causes the plugs first to turn away from each other, so that the openings of their recesses are turned in opposing directions, thus preventing the escape of the screws therefrom, the withdrawing of the plugs within the face-plate K during such turning operation being prevented by the bearing of the semicircular rear faces of the plugs I against the semicircular forward faces of the plugs $i^2$. During the said turning, however, the said semicircular faces pass out of line with each other, and the plate L bears against the collars $i'$ and draws the plugs rearward, causing the face $a$ of the block to be turned to be drawn firmly against the face-plate K. The tension of the rod M also causes the block H to be drawn rearward and forces its spherical surface $h$ so firmly against the spherical surface $f^2$ of the head $f'$ as to lock such parts together. It will therefore be seen that by means of the said chuck the block from which the toe part is to be formed can be engaged with the said chuck and can be adjusted into approximately the same position as the model occupies with reference to the axis of revolution and that when so adjusted the tightening of the hand-wheel $m$ by the clamping of the block H against the head $f'$ secures the said block A in the adjusted position.

Continuing the description of the method of forming lasts, the model having been secured to its chuck and the block A in the condition illustrated in Figs. 1 and 2 having been secured to its chuck the model-wheel is caused to contact with the model at the rear end of the foot-shape surface, and the lathe is set in operation, causing the forming of the foot-shape surface of the new toe part to progress toward the toe instead of away from the same, although, except in the formation of the extremity of the toe, it is immaterial in which direction the turning occurs. The foot-shape contour is thus formed and the extremity of the toe can be shaped. I have found in actual practice that the extremity of the toe can be more perfectly formed by causing the model-wheel to travel toward such extremity than by causing it to travel in a rearward direction, the reason appearing to be that it is easier for the model-wheel to slide down the tapering extremity of the toe part toward its tip than to climb up such extremity, the result being less of a strain on the lathe, and the cutters not marring the toe in any way. After the foot-shape contour of the toe part has been formed the model-wheel and cutter are returned to the butt-ends of their respective parts, and the swing-frame is allowed to travel inward beyond the foot-shape contour of the model, owing to the fact that the face $d$ of the model slips by the model-wheel, so that the side of the model-wheel comes in contact with said rear face, and this permits the cutter-head of the lathe to form a rear face $n$ on the rear end of the new toe part N, the said rear face bearing precisely the same relation to the foot-shape contour of the last part as the rear face $d$ of the model toe part bears to the foot-shape contour of the said model. The swing-frame is then drawn away from the model-wheel and cutter-head, and the head-stock spindles and chucks are stopped in such a position that a line in the model toe part which would be parallel to the walls of the slot in the heel part is parallel to a plane passing through two pointed rods O, which are mounted to slide in bearings in the head-stock G, which bearings are parallel with the axis of the spindle C'. The said rods are pointed at their forward ends, and at their rearward ends they are pivoted to a lever P, that is fulcrumed upon the head-stock G, the lever serving to cause the rods to move toward the rear face $n$ of the new toe part. By means of the said lever two indentations $n'$ are made in the rear face of the new toe part. The toe part is then removed from the chuck, and the screws B having been taken out of the toe part the latter is placed upon a face-plate Q of the machine illustrated in Fig. 13, the said face-plate being conveniently provided with pins $q$, upon which the indentations $n'$ in the new toe part can be engaged. The said machine is provided with means for dressing off the stub $n^2$ left on the rear end of the toe part N, owing to the fact that the chuck prevented the cutter-head from traversing the entire rear in said toe part. Such means in the form chosen for illustration consist of a spindle $q^2$, mounted in bearings perpendicular to the face-plate Q, the said spindle having a cutter $q^3$ upon its upper end and being capable of movement toward and from the face-plate. When the spindle is set in motion and is moved toward the toe part, its cutter dresses off the stub $n^2$, and the spindle is preferably provided with a collar or other stop $q^4$, which limits the movement of the cutter toward the toe part to a position coincident with the face of the face-plate, thereby causing the surface formed by the cutter to be a continuation of the surface $n$, formed by the cutter-head of the lathe. The rear surface of the toe part is now completely finished and in accurate relation to the foot-shape contour. The toe part is now in the condition illustrated in Figs. 7 and 8. In order to provide holes for the screws on the rear end of the toe part which are to engage the hinge-plate of the last, the toe part N is placed against a face-plate R of a drilling-machine, the said face-plate being provided with tapered pins $r$, upon which the indentations $n'$ can be fitted. The toe part is thus properly positioned with reference to the drills $r'$, so that the holes to be formed by said drills will be in such relation to the foot-shape contour that the toe part will when the toe part is engaged with the hinge come flush with the foot-shape contour of the heel part. The holes $n^3$ are then drilled by the drills $r'$, and the toe part is complete, except for the driving in of screws into the said holes $n^3$.

As another illustration of the application of my process I have illustrated in Figs. 15 to 26 the formation of interchangeable heel parts of the last in the application before mentioned. The block S, from which the heel part is to be formed, is provided with a dressed surface $s$, in which are driven three screws $s'$ in proper position to be engaged by the plugs I of the chuck, before described, and the said block is engaged on the said chuck, the said chuck before being tightened being tipped to an approximately horizontal position. The heel-part model is secured to the model-chuck so that its rear face shall be vertical. The foot-shape contour $s^2$ of the new heel-block is then formed and the extremity turned in the manner described in connection with the toe part. A vertical rear surface $s^3$ and indentations $s^4$ are formed in the same way as the corresponding parts were formed on the toe part. The screws $s'$ are then removed, and the stub $s^5$ on the heel part is dressed off by the machine illustrated in Fig. 13, leaving the heel part in the condition illustrated in Figs. 21 and 22. The heel part is then placed upon the face-plate T of a routing-machine and secured in a clamp U, the clamp being placed against a guide $t$ and the indentations $s^4$ of the heel part being engaged, as illustrated in Fig. 24, upon pins $t'$ on the face-plate in proper relation to the guide $t$ to cause the heel part to be properly positioned laterally in the clamp. The clamp consists of a side $u$, adapted to bear against the guide $t$, and of a plate $u'$, having a surface $u^2$ that is perpendicular to the bearing-surface of the plate $u$, the said surface $u^2$ being adapted to receive the bottom surface $s^6$ of the heel part. The heel part is pressed against the plate $u$ by a plate $u^3$, which rests upon the upper surface $s^7$ of the heel part, the said plate $u^3$ being forced toward the plate $u'$ by slides $u^4$, having screws $u^5$, that bear against the plate $u^3$, the said slides being drawn rearward by an eccentric $u^6$, that bears against a plate $u^7$, the latter being pivoted to the said slides. The eccentric is mounted upon a shaft that is turned by a handle $u^8$. The screws $u^5$ permit the adjustment of the plate $u^3$ to suit heel parts of different height. A vertical slot $u^9$ is formed in the plate $u^3$, and a similar slot is formed in the plate $u'$ to permit the passage of cutters on the machine, by which the slot $s^8$ in the heel part for the reception of the hinge is formed, the heel part being guided during its passage of the cutters by the guide $t$. The other formations on the heel part for fitting the hinge can be made in proper relation to the slot by using the slot as a chucking-surface.

It is obvious that various changes can be made in the above-illustrated procedure. For instance, the rear surface $n$ of the new toe part need not be made by a cutter guided from a similar surface $d$ on the model, but the model can have any desired formation at its rear end or no regular formation, and the surface $n$ be formed by a cutter having a path of travel fixed with relation to the swing-frame, so that said surface $n$ will be formed without any relation to a corresponding surface on the model. The said surface $n$ can be formed at an angle to the axis of rotation instead of perpendicular thereto, if desired, by forming it by means of a cutter guided in a corresponding path.

The formation of the extremities of the last parts in the lathe is the subject of an application for patent, Serial No. 19,293, filed June 6, 1900. The method of forming a last part, which consists in first forming the foot-shape contour and afterward or at the same time forming a geometrical or other regular surface in proper relation thereto in the lathe is the subject of an application for patent filed by me October 20, 1902, Serial No. 127,931, dated August 15, 1906. I do not, therefore, claim these methods broadly in the present application; but What I do claim is—

1. The method of forming lasts or last parts, consisting in forming on a model a regular surface such as a plane, or a surface of revolution supporting the model and the block to be turned by one extremity, so as to leave the body portion and the opposite extremity exposed, forming the foot-shape contour and one extremity, and then forming a regular surface on the last or last part to be formed by a cutter guided in a definite relation to the surface on the model.

2. The method of forming lasts or last parts, which consists in forming a plane surface on the model, supporting the model in the lathe so that the plane surface thereon shall be perpendicular to the axis of revolution and so that an extremity of the model shall be exposed, supporting a block in the lathe, so that an extremity thereof shall be exposed, forming the foot-shape contour of the last, forming the extremity of the last, and then forming a plane surface corresponding to the plane surface in the model by a cutter guided from the said plane surface on the model.

3. The method of forming lasts or last parts, which consists in forming on a model a regular surface such as a plane, or a surface of revolution supporting the model and a block in the lathe, so that an extremity of each shall be exposed, and shaping the extremity of the last to be formed by a cutter guided from the extremity of the model, the cutter and cutter-guide traveling in a general direction toward the tip of the extremity, as distinguished from a direction away from such tip.

4. The method of forming lasts or last parts, which consists in forming on a model a regular surface such as a plane, or a surface of revolution supporting the model and a blank in the lathe, so that an extremity of each shall be exposed, and shaping the extremity of the last to be formed by a cutter guided from the extremity of the model, the cutter and guide traveling in a general direction toward the tip of the extremity and the cutter revolving on an axis parallel to this line of travel.

In testimony that I claim the foregoing I have hereunto set my hand.

EDWIN J. PRINDLE.

Witnesses:
  JOSEPHINE L. LAWLOR,
  KATHERINE E. LAWLOR.